US012258757B2

(12) United States Patent
Bergman

(10) Patent No.: US 12,258,757 B2
(45) **Date of Patent: *Mar. 25, 2025**

(54) MOUNTING HARDWARE AND MOUNTING SYSTEM FOR VERTICAL PANELS

(71) Applicant: ARMSTRONG WORLD INDUSTRIES, INC., Lancaster, PA (US)

(72) Inventor: Todd M. Bergman, Lititz, PA (US)

(73) Assignee: AWI Licensing LLC, Wilmington, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/575,295

(22) Filed: Jan. 13, 2022

(65) Prior Publication Data

US 2022/0136246 A1 May 5, 2022

Related U.S. Application Data

(63) Continuation of application No. 16/928,451, filed on Jul. 14, 2020, now Pat. No. 11,255,087, which is a (Continued)

(51) Int. Cl.

| | |
|---|---|
| ***E04B 9/00*** | (2006.01) |
| ***E04B 9/20*** | (2006.01) |
| ***E04B 9/22*** | (2006.01) |
| ***E04B 9/24*** | (2006.01) |
| ***E04B 9/34*** | (2006.01) |

(Continued)

(52) U.S. Cl.
CPC ................ *E04B 9/34* (2013.01); *E04B 9/008* (2013.01); *E04B 9/205* (2013.01); *E04B 9/225* (2013.01); *E04B 9/24* (2013.01); *E04B 9/366* (2013.01); *G09F 2007/186* (2013.01)

(58) Field of Classification Search
CPC . E04B 9/006; E04B 9/008; E04B 9/22; E04B 9/18; E04B 9/225; E04B 9/24; E04B 9/26; E04B 2/827; E04B 9/34; E04B 9/205; E04B 9/366; G09F 2007/186
See application file for complete search history.

(56) References Cited

U.S. PATENT DOCUMENTS 656,275 A * 8/1900 Streeter .................... E04B 9/16 256/72
2,386,887 A * 10/1945 Eckel ...................... F16B 15/00 52/715

(Continued)

FOREIGN PATENT DOCUMENTS

CA 2321341 A1 * 3/2002 ............. E04B 9/006
DE 4210497 A1 * 10/1993 ........... E04D 12/008

(Continued)

*Primary Examiner* — Ryan D Kwiecinski
(74) *Attorney, Agent, or Firm* — Patrick Sheldrake

(57) ABSTRACT

A mounting clip and a system for mounting a vertical panel from a support member suspended from a ceiling. The mounting clip has a panel mounting section, a support member receiving portion, and a movable mounting section. The support member receiving portion extends from the panel mounting section. The movable mounting section can be rotated relative to the support member receiving portion to secure the mounting clip to the support member.

20 Claims, 10 Drawing Sheets

Related U.S. Application Data continuation of application No. 16/390,503, filed on Apr. 22, 2019, now Pat. No. 10,724,239, which is a continuation of application No. 15/707,040, filed on Sep. 18, 2017, now Pat. No. 10,294,664, which is a continuation of application No. 15/044,761, filed on Feb. 16, 2016, now Pat. No. 9,765,519, which is a continuation of application No. 14/204,299, filed on Mar. 11, 2014, now Pat. No. 9,279,251, which is a continuation of application No. 13/474,077, filed on May 17, 2012, now Pat. No. 8,695,296.

(60) Provisional application No. 61/486,991, filed on May 17, 2011.

(51) Int. Cl.
*E04B 9/36* (2006.01)
*G09F 7/18* (2006.01)

(56) References Cited

U.S. PATENT DOCUMENTS 2,389,964 A * 11/1945 Eckel ........ E04B 9/22 52/715
2,499,278 A * 2/1950 Olsen ........ E04B 9/16 52/309.1
3,561,717 A * 2/1971 Frederick ........ B65G 17/20 118/500
3,567,169 A * 3/1971 Frederick et al. ........ B66C 1/64 118/500
3,612,461 A * 10/1971 Brown ........ E04B 9/18 52/506.07
3,986,314 A * 10/1976 Moeller ........ E04B 9/006 D25/138
4,031,664 A * 6/1977 Wendt ........ E05D 15/06 248/300
4,073,108 A * 2/1978 Williams ........ E04B 2/825 52/262
4,197,923 A * 4/1980 Harris ........ E04B 9/34 181/291
4,200,171 A * 4/1980 Seymour ........ E04B 1/86 181/291
4,209,953 A * 7/1980 Wendt ........ E04B 9/008 52/241
4,227,355 A * 10/1980 Wendt ........ E04H 1/1238 52/64
4,245,442 A * 1/1981 Durham ........ E04B 2/821 52/241
4,703,598 A 11/1987 Wilson et al.
4,709,888 A * 12/1987 Cubit ........ F16L 3/221 52/39
4,723,749 A * 2/1988 Carraro ........ E04B 9/18 52/39
4,726,165 A * 2/1988 Brinsa ........ E04B 9/26 52/713
4,827,687 A * 5/1989 Frawley ........ E04B 9/245 52/473
4,905,952 A * 3/1990 Pinquist ........ E04B 9/16 24/537
4,908,915 A * 3/1990 Ruggles ........ E04B 9/008 24/339
5,090,171 A * 2/1992 Kano ........ E05D 15/0608 160/199
5,228,263 A * 7/1993 Vaughn ........ E04B 9/008 52/715
5,335,890 A * 8/1994 Pryor ........ A47H 15/02 248/343
5,357,651 A * 10/1994 Jones ........ E05D 15/0613 49/409
5,444,945 A * 8/1995 Goodwin ........ E04F 19/06 52/220.1
5,468,035 A * 11/1995 Fountain ........ B66C 1/64 248/228.4
5,480,116 A * 1/1996 Callas ........ G09F 7/08 248/340
5,623,130 A 4/1997 Noxon
5,653,412 A * 8/1997 Martorano ........ F21V 21/34 362/418
6,260,810 B1 * 7/2001 Choi ........ F16L 3/24 248/65
6,457,692 B1 * 10/2002 Gohl, Jr. ........ F24F 13/32 248/301
6,629,386 B1 * 10/2003 Cornell ........ G09F 15/0068 160/214
6,637,710 B2 * 10/2003 Yaphe ........ E04B 9/006 248/342
RE38,463 E * 3/2004 Anderson ........ G09F 7/18 248/329
D513,171 S * 12/2005 Richardson ........ D8/394
7,478,787 B2 * 1/2009 Bankston ........ E04B 9/18 52/506.07
7,575,213 B2 * 8/2009 Rausch ........ F16L 3/02 248/339
7,637,065 B2 12/2009 Ahren et al.
8,051,618 B2 * 11/2011 Ahren ........ E04B 9/225 52/39
8,057,077 B2 * 11/2011 Gagne ........ F21V 21/02 362/147
8,327,591 B2 * 12/2012 Wilkinson, Jr. ........ E04B 9/366 52/506.07
8,341,913 B2 * 1/2013 Meres ........ E04B 9/241 52/489.1
2002/0060280 A1 * 5/2002 Yaphe ........ E04B 9/006 248/228.7
2005/0189462 A1 * 9/2005 Berlyn ........ F24F 13/32 248/317
2006/0248826 A1 * 11/2006 Owens ........ E04B 2/827 52/243.1
2007/0101670 A1 * 5/2007 Ahren ........ E04B 9/225 52/522
2007/0145222 A1 * 6/2007 Rausch ........ F24F 13/0254 248/317
2010/0011699 A1 1/2010 Weimer et al.
2011/0011023 A1 * 1/2011 Gulbrandsen ........ E04B 9/065 52/506.07
2011/0099866 A1 * 5/2011 Pitcher ........ G09F 7/20 40/611.01
2011/0232219 A1 * 9/2011 Wilkinson, Jr. ........ E04B 9/366 52/474
2012/0291397 A1 * 11/2012 Bergman ........ E04B 9/205 248/343
2012/0318467 A1 * 12/2012 Levin ........ E04B 2/827 160/194
2013/0047541 A1 * 2/2013 Mayer ........ E04B 9/065 52/506.05

FOREIGN PATENT DOCUMENTS

EP 0197594 A2 10/1986
JP 06257234 A 9/1994
RU 57774 U1 10/2006
SU 1725740 A3 4/1992
WO WO-0063507 A1 * 10/2000 ........ E04B 9/16

* cited by examiner

MOUNTING HARDWARE AND MOUNTING SYSTEM FOR VERTICAL PANELS

CROSS-REFERENCE TO RELATED APPLICATIONS

The present application is a continuation of U.S. patent application Ser. No. 16/928,451, filed on Jul. 14, 2020, now allowed, which is a continuation of U.S. patent application Ser. No. 16/390,503, filed on Apr. 22, 2019, now allowed, which is a continuation of U.S. patent application Ser. No. 15/707,040, filed on Sep. 18, 2017, now allowed, which is a continuation of U.S. patent application Ser. No. 15/044,761, filed on Feb. 16, 2016, now allowed, which is a continuation of U.S. patent application Ser. No. 14/204,299, filed on Mar. 11, 2014 (now U.S. Pat. No. 9,279,251), which is a continuation of U.S. patent application Ser. No. 13/474,077, filed on May 17, 2012 (now U.S. Pat. No. 8,695,296), which in turn claims the benefit of U.S. Provisional Patent Application Ser. No. 61/486,991, filed on May 17, 2011, the entireties of which are incorporated herein by reference.

FIELD OF THE INVENTION

The present invention is directed to mounting hardware and mounting system for use with vertical panels, and more particularly to mounting hardware for vertically extending acoustical ceiling baffles.

BACKGROUND OF THE INVENTION

In many commercial buildings, it is desirable to alter room acoustics by providing vertically extending ceiling components intended to absorb sound waves to diminish room noise. In addition, vertically extending panels may be used to aesthetically separate areas of a large space with overhead panels or decorative valances projecting downward from a ceiling. These overhead panels are also referred to as soffits, valances, and bulkheads in different settings. Additionally, overhead panels may be connected to a ceiling to provide a vertical mounting surface for advertising information, menu information, or other displays in various retail establishments.

Generally, vertically extending panels are mounted using wires which are directly mounted to the ceiling. However, as the panels are mounted with wires or the like, the repair and replacement of the panels is made difficult, as there is no easy method of removing the panels from the wires. In addition, as the panels are mounted directly to the ceiling, in order to move or rearrange the panels requires that the wires be removed from the ceiling and reaffixed to the ceiling in a different location. This is both time consuming and costly. In addition, depending on the duct work, lighting, etc. found in the ceiling, the mounting of the panels in the proper position may be difficult to accomplish.

It would, therefore, be beneficial to provide mounting hardware and a mounting system which allowed to the vertical panels to be easily removed and replaced, thereby allowing the repair or replacement of damaged panels. It would also be beneficial to provide mounting hardware and a mounting system which allows for the repositioning of the panels as needed.

SUMMARY OF THE INVENTION

One embodiment of the invention is directed to a mounting clip for mounting a vertical panel to a support member, the mounting clip comprising: a horizontal plate having a top surface, a bottom surface, a first end, and a second end opposite the first end; a movable mounting section rotatably coupled to the second end of the horizontal plate so as to be rotatable about a first rotational axis, the movable mounting section comprising a horizontal portion and a mounting flange extending downwardly from the horizontal portion; and wherein the movable mounting section is rotatable between: (1) a first position in which a top surface of the horizontal portion of the movable mounting section is in plane with the top surface of the horizontal plate; and (2) a second position in which the top surface of the horizontal portion of the movable mounting section is adjacent to the top surface of the horizontal plate so that a first slot is formed between the top surface of the horizontal portion of the movable mounting section and the top surface of the horizontal plate.

One embodiment of the invention is directed to a mounting clip for mounting a vertical panel to a support member, the mounting clip comprising: a horizontal plate having a top surface, a bottom surface, a plate axis extending between a first end and a second end, and a first edge and a second edge extending between the first and second ends; a movable mounting section rotatably coupled to the second end of the horizontal plate so as to be rotatable about a first rotational axis, the first rotational axis being substantially parallel to the plate axis; a first vertical sidewall extending downwardly from and rotatably coupled to the first edge of the horizontal plate so as to be rotatable about a second rotational axis, the second rotational axis being substantially transverse to the plate axis; and a second vertical sidewall extending downwardly from and rotatably coupled to the second edge of the horizontal plate so as to be rotatable about a third rotational axis, the third rotational axis being substantially transverse to the plate axis.

In another aspect, the invention can be a mounting clip for mounting a vertical panel to a support member, the mounting clip comprising: a horizontal plate having a first end, a second end and a top surface; a movable mounting section rotatably coupled to the second end of the horizontal plate so as to be rotatable about a first rotational axis between: (1) a first position in which no plane perpendicular to the top surface of the horizontal plate intersects the movable mounting section; and (2) a second position in which the movable mounting section at least partially overlaps the horizontal plate so that a slot is formed between the movable mounting section and the top surface of the horizontal plate; a first vertical sidewall rotatably coupled to the horizontal plate so as to be rotatable about a second rotational axis; a second vertical sidewall rotatable coupled to the horizontal plate so as to be rotatable about a third rotational axis; and wherein the first rotational axis is substantially parallel to the plate axis and wherein each of the second and third rotational axes are substantially transverse to each of the plate axis and the first rotational axis.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
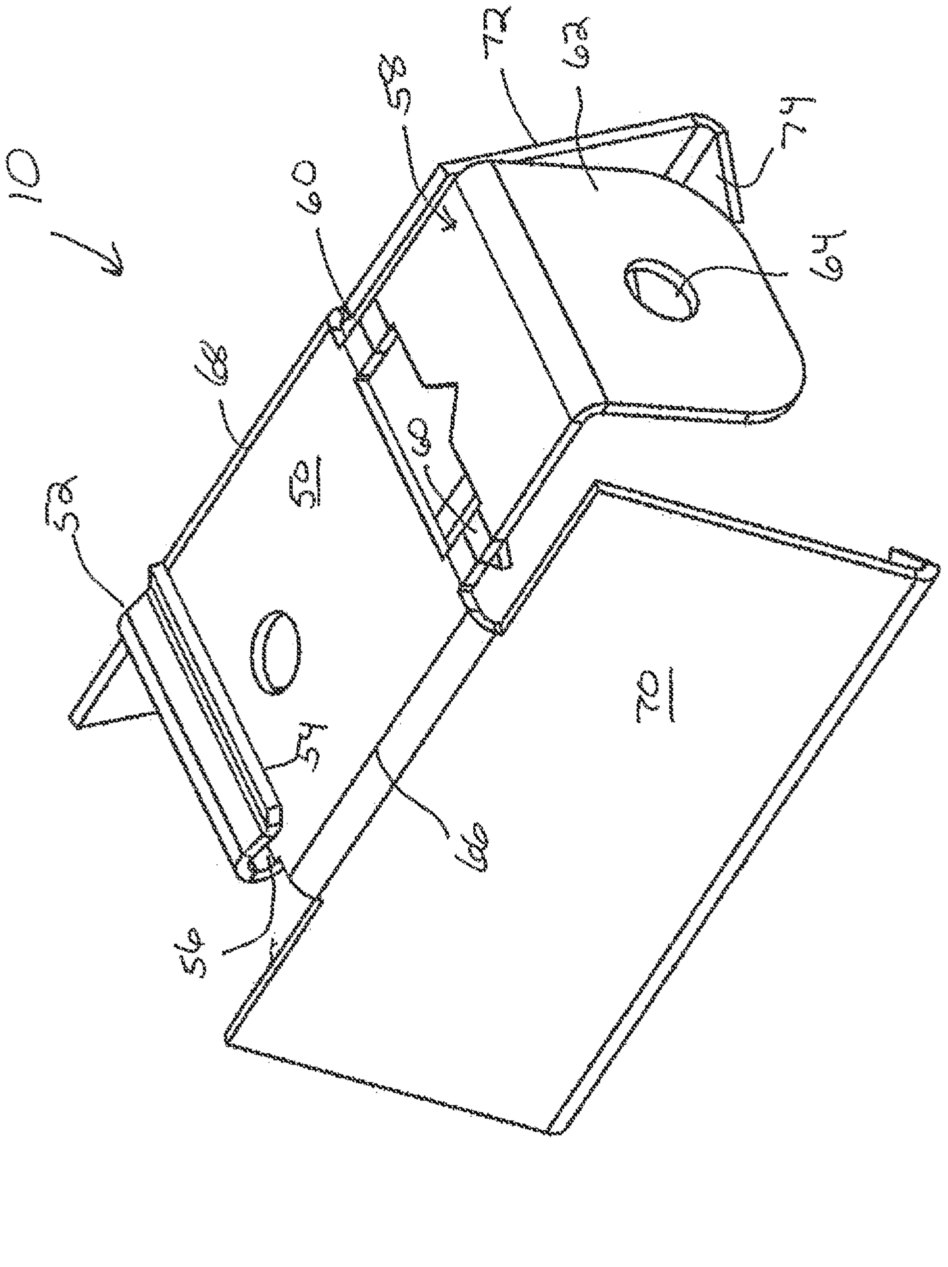
FIG. 1 is a perspective view of an exemplary mounting hardware according the invention.
Figure 2:
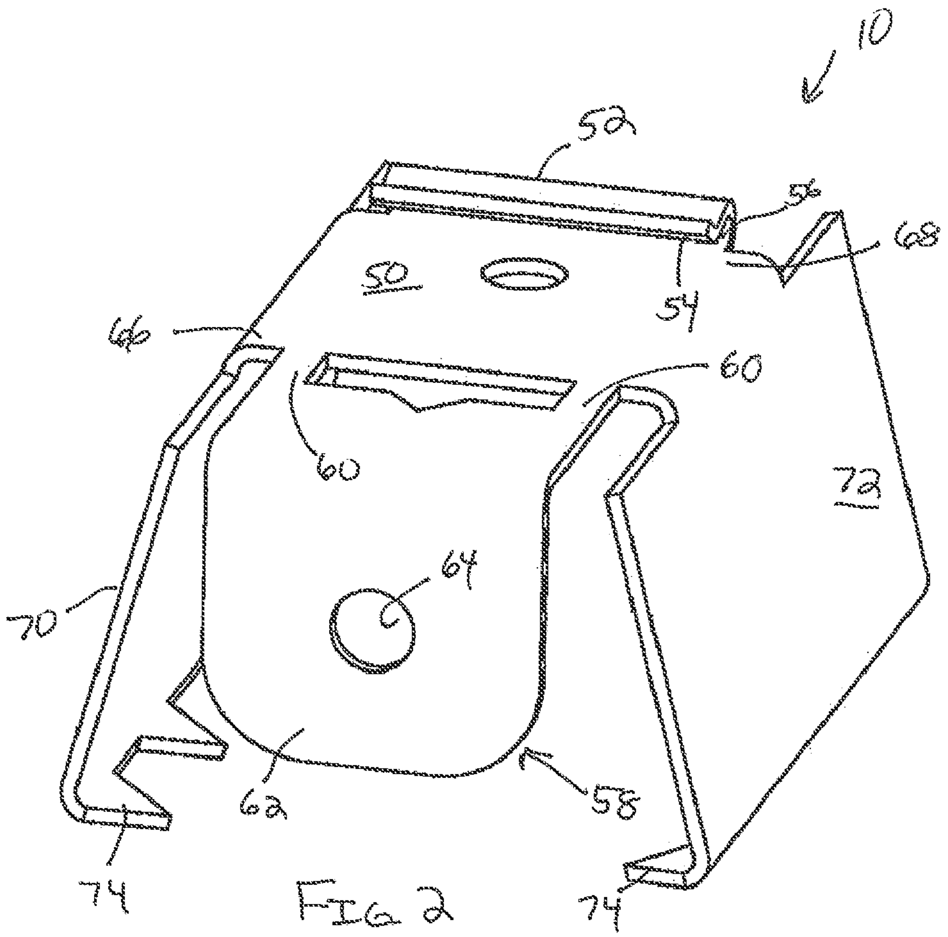
FIG. 2 is an alternate perspective view of the exemplary mounting hardware shown in FIG. 1.
Figure 3:
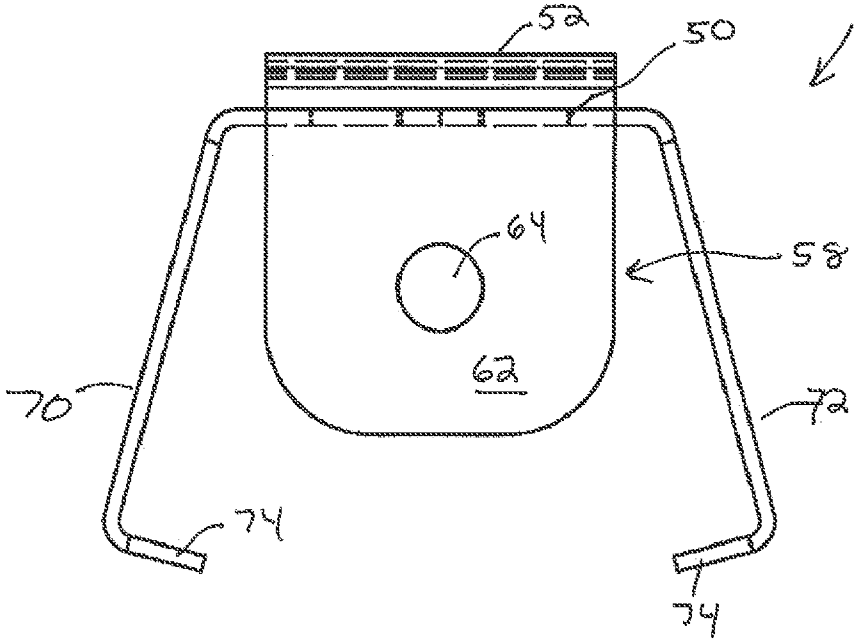
FIG. 3 is an end view of the exemplary mounting hardware shown in FIG. 1.
Figure 5:
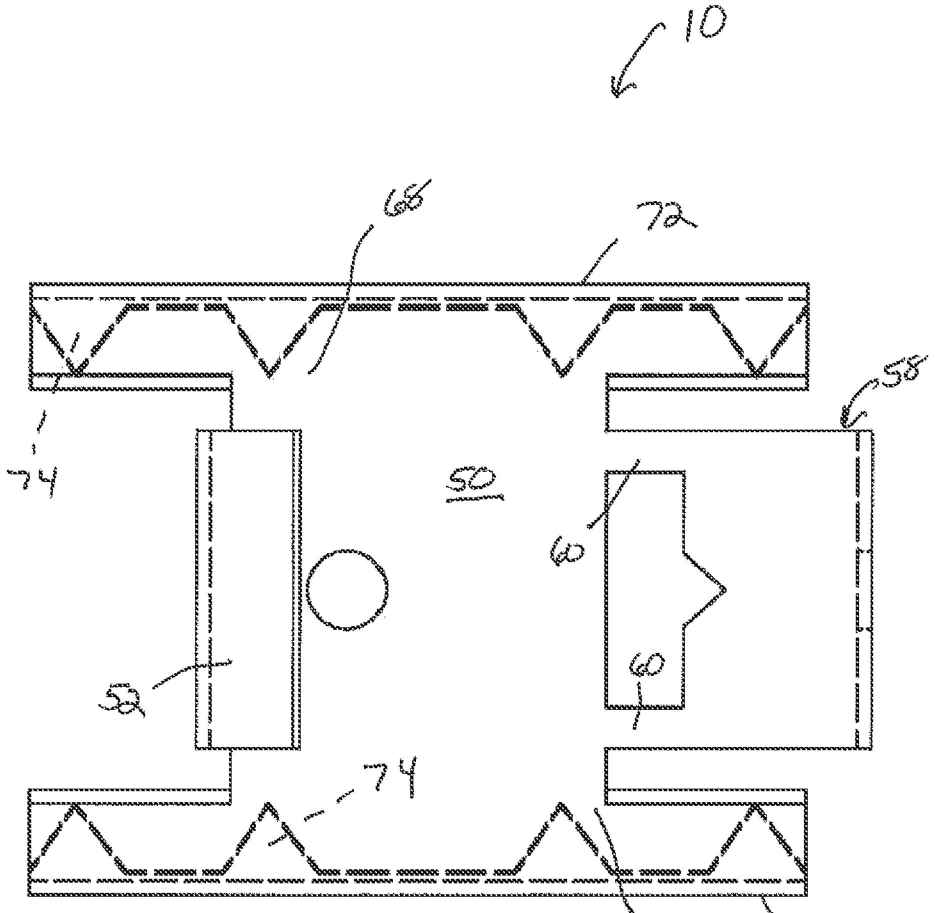
FIG. 5 is a top view of the exemplary mounting hardware shown in FIG. 1, with the teeth shown in phantom.
Figure 4:
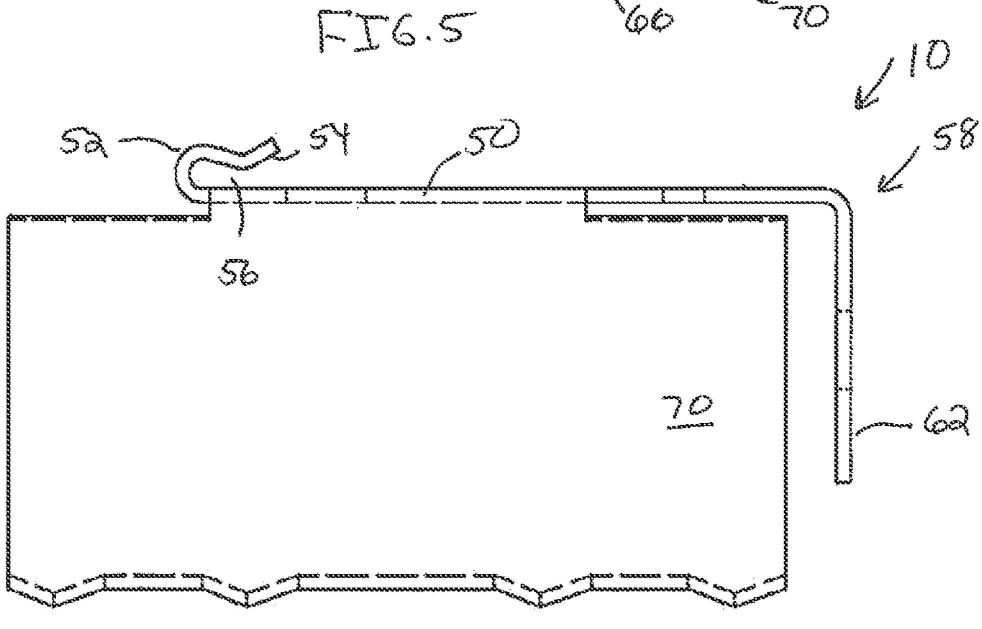
FIG. 4 is a side view of the exemplary mounting hardware shown in FIG. 1.

The present invention will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that spatially relative terms, such as “vertical”, “horizontal”, “upper”, “lower” and the like, may be used herein for ease of description to describe one element’s or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “upper” elements or features would then be oriented “lower” than the other elements or features. Thus, the exemplary term “upper” can encompass both an orientation of upper and lower. The device may be otherwise oriented (rotated 90 degrees or at other orientations) and the spatially relative descriptors used herein interpreted accordingly.

FIGS. 1 through 7 illustrate an exemplary embodiment of mounting hardware 10 and a mounting system 12 for mounting a vertical panel 14 to a structural support member 16 which is mounted to a ceiling or the like. The panels may be used for different purposes, including, but not limited to improving the acoustics of the space, aesthetically separating areas of a large space, or providing a vertical mounting surface for advertising information, menu information, or other displays in various retail establishments.

Figure 6:
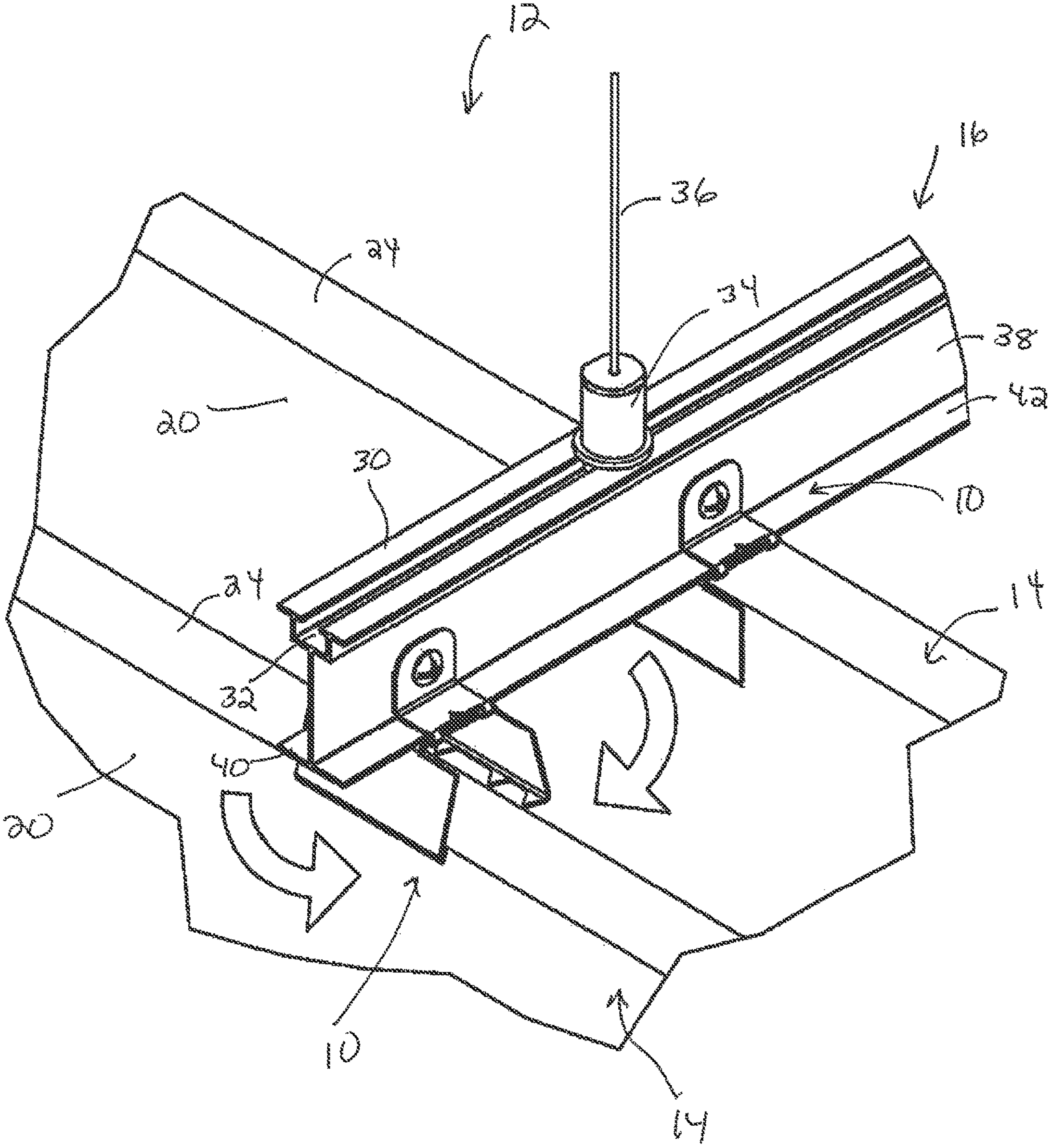
FIG. 6 is a perspective view of two panels positioned proximate a support member, with one of the mounting hardware shown in an open position and the other mounting hardware shown in a closed position.
Figure 7:
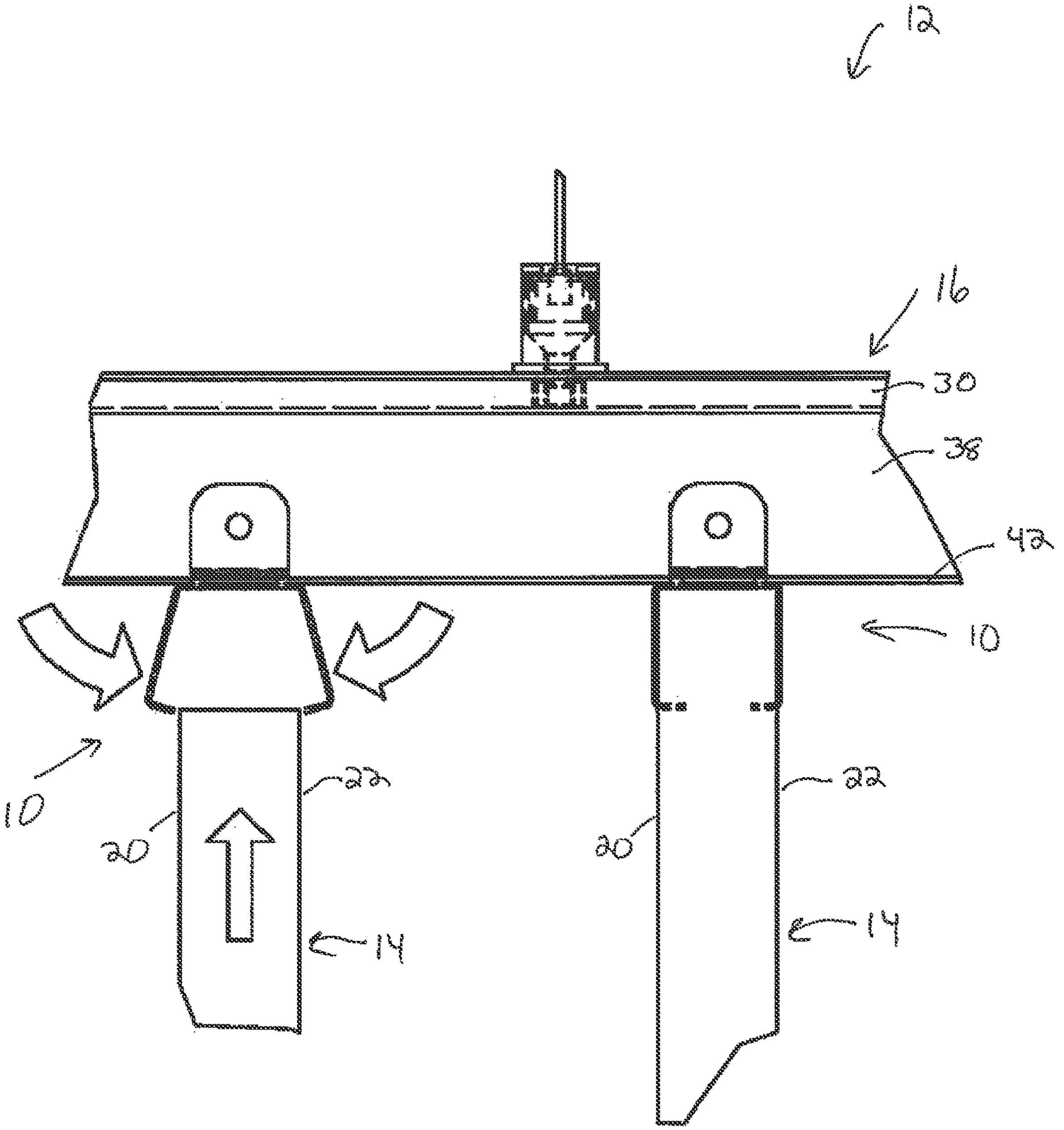
FIG. 7 is an end view of the two panels, support member and mounting hardware shown in FIG. 6.
Figure 8:
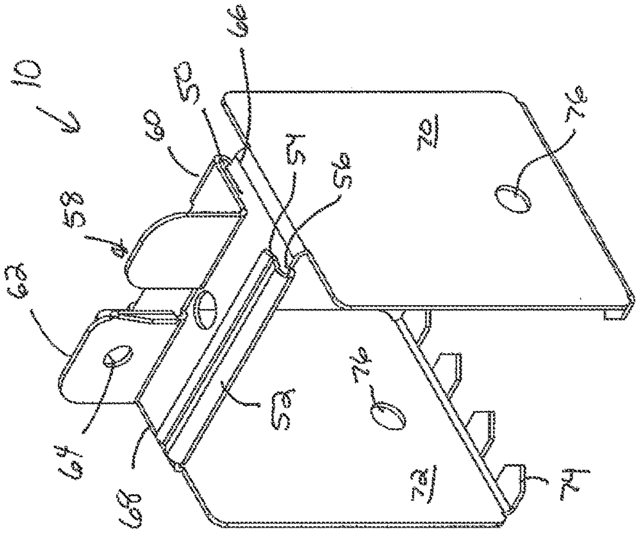
FIG. 8 is a perspective view of an alternate exemplary mounting hardware according the invention.
Figure 10:
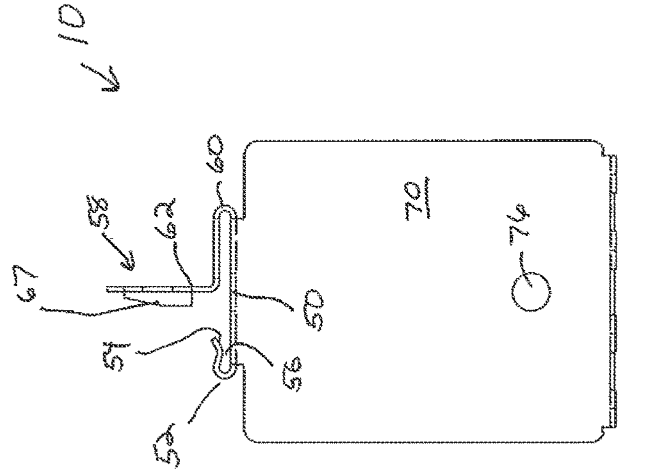
FIG. 10 is a side view of the exemplary mounting hardware shown in FIG. 8.
Figure 9:
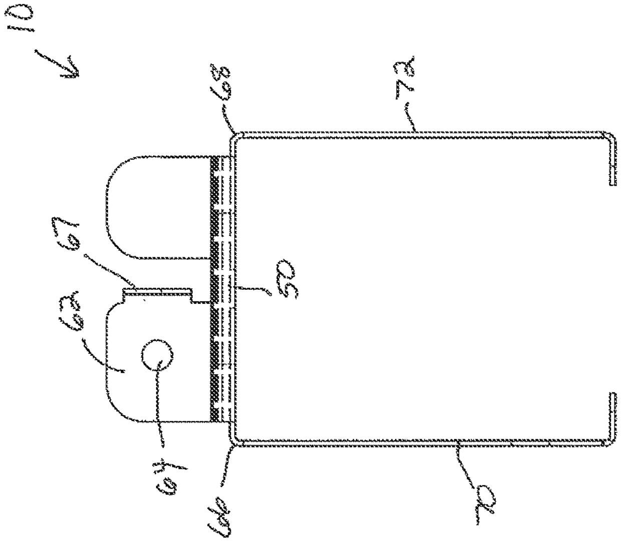
FIG. 9 is an end view of the exemplary mounting hardware shown in FIG. 8.
Figure 11:
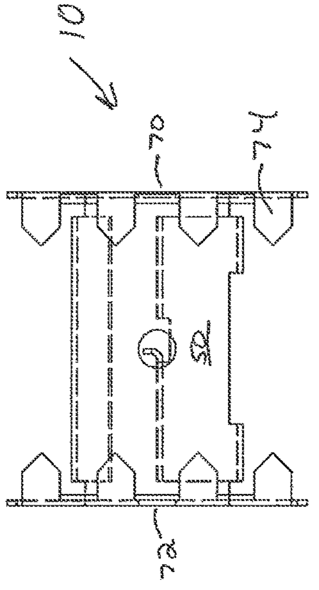
FIG. 11 is a bottom view of the exemplary mounting hardware shown in FIG. 8.

In accordance with one exemplary embodiment of the invention, the mounting system 12 provides a platform for mounting at least one overhead, vertical panel 14 that is supported on the support member 16, as will be discussed in further detail below. The overhead panel 14 drops down in a generally vertical orientation from the plane of the ceiling and can be combined with additional panels 14 or used individually. FIGS. 6 and 7 illustrate a perspective view of the overhead mounting system 12 in accordance with one exemplary embodiment. The mounting system 12 includes one or more support members 16, the mounting hardware 10, and one or more panels 14.

Figure 12:
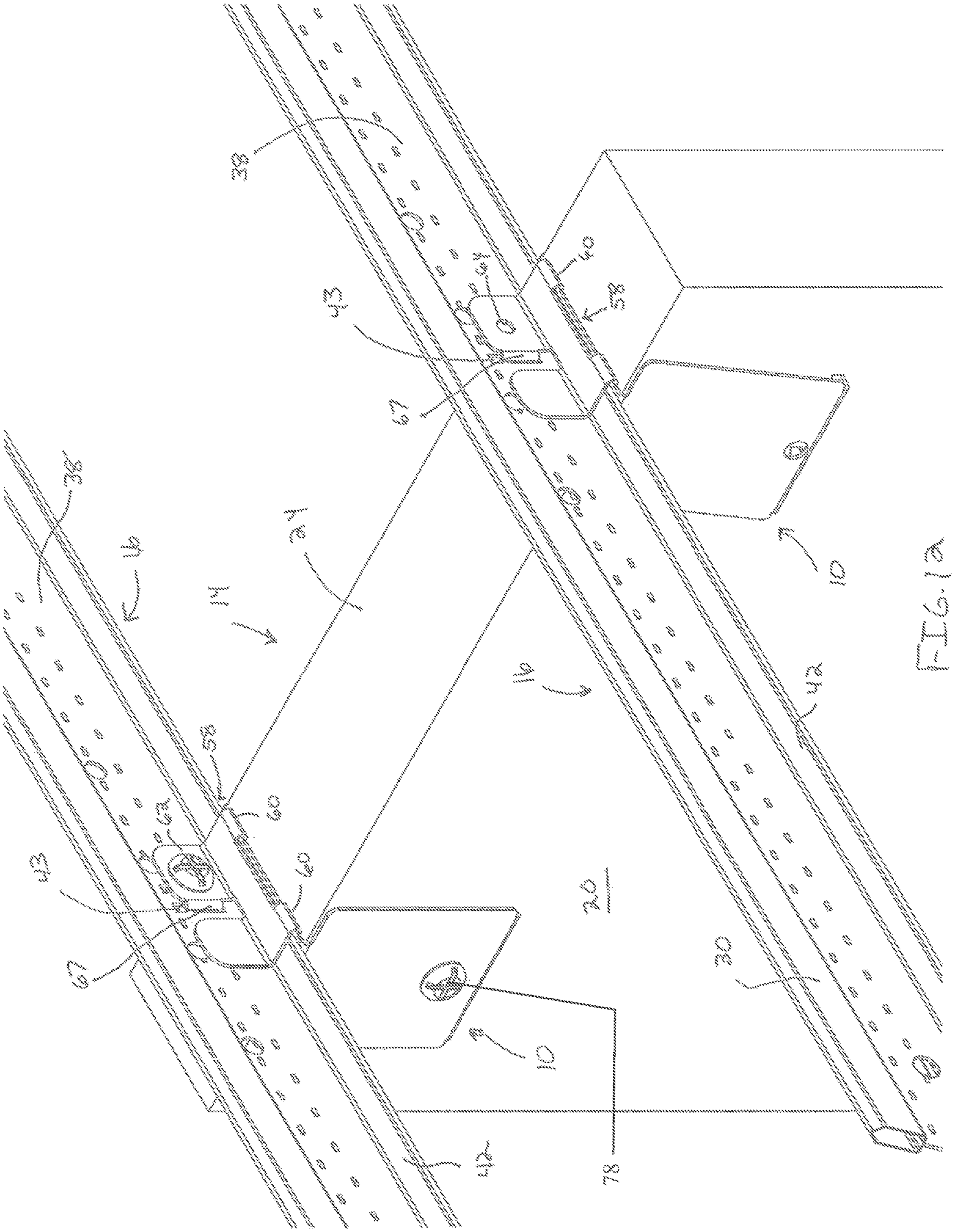
FIG. 12 is a perspective view of a panel positioned proximate to and mounted on two support members.

The panels 14 are any known panels which perform the desired function. As is best shown in FIGS. 6, 7 and 12, in general, the panels are made from lightweight material having a first surface 20 and an oppositely facing second surface 22. A mounting surface or edge 24 extends between the first surface 20 and the second surface 22. In the exemplary embodiment shown, the panels 14 are rectangular, however, the panel can take any suitable shape, length, or width. While other embodiments may be used, in one example the panel 14 contains a cellular core having first and second side walls that are covered by a veneer or laminated outer skin. The veneer or outer skin may be any color according to the aesthetic desired. The cellular core may be made of a foam material, such as, but not limited to polystyrene that allows the vertical panel to be lightweight, for example, around 1-2 pounds per linear foot of elongate length. The outer skin may be formed of a suitable lightweight material, such as, but not limited to, material having the acoustic properties required, high impact polystyrene or expanded PVC. The type of material will depend upon the application for which the panel is to be used.

As is best shown in FIGS. 6, 7 and 12, in the exemplary embodiment shown, the support members 16 have a modified I-shaped cross-section, which is most clearly shown in FIG. 6. The support member 16 has a top mounting section 30 having a slot 32 for receiving an end 34 of a mounting wire 36 which is mounted to the ceiling or the like. However, other configurations of the top mounting section 30 and other methods of mounting the support member 16 to the ceiling can be used without departing from the scope of the invention. A vertical flange 38 extends between the mounting section 30 and horizontal cross members or flanges 40, 42. As shown in the alternate embodiment of FIG. 12, locating slots 43 may also be provided periodically along the vertical flange 38.

According to the exemplary embodiment, the mounting hardware or mounting clip 10 includes an upper generally horizontal plate 50 with a support member receiving portion or flange receiving portion or hook arm 52 which extends from one end thereof. The hook arm 52 has a lead-in surface 54 and a slot 56. Extending from the other end of the horizontal plate 50 is a movable mounting section 58. The movable mounting section 58 has connection legs 60 which extend between the plate section 50 and the mounting section 58, the legs being 60 being configured to allow the mounting section 58 to rotate about the plate section 50. The mounting section 58 has a mounting flange 62 with a screw receiving opening 64 which extends therethrough. As shown in the alternate exemplary embodiment of FIG. 8 through 12, a locating tab 67 may also be provided on the mounting section 58.

The plate section 50 has a first edge 66 and an oppositely facing second edge 68. A first vertical sidewall section 70 extends downwardly from the plate section 50 at the first edge 66. A second vertical sidewall section 72 extends downwardly from the plate section 50 at the second edge 68. The first and second vertical sidewall sections 70, 72 extend from the plate section 50 such that the first and second vertical sidewall sections 70, 72 are allowed to rotate or pivot about the plate section 50 allowing the first and second vertical sidewall sections 70, 72 to be moved between an open and an closed position. The plate section 50 and the first and second vertical sidewall sections 70, 72 form a panel mounting section. The first and second vertical sidewall sections 70, 72 include a plurality of teeth 74, which, in the exemplary embodiment shown, are also formed along the length of the sidewall sections 70, 72 proximate the edge of the first and second vertical sidewall sections 70, 72 which are furthest from the plate section 50. The teeth 74 are substantially in alignment on both the first and second vertical sidewall sections 70, 72 so that the teeth 74 are in general vertical alignment with each other in elevation when the first and second vertical sidewall sections 70, 72 are moved to the closed position, as will be more fully described. However, other configurations of the teeth 74 are possible without departing from the scope of the invention.

An optional opening 76 may be provided in the first and second vertical sidewall sections 70, 72. This opening is shown in the embodiment illustrated in FIGS. 8 through 12, however, the opening may be provided in other embodiments, including, but not limited to the embodiment shown in FIGS. 1 through 7. The openings 76 permit mounting hardware 78, such as, but not limited to, a nut and bolt, to extend through the openings.

Referring to FIGS. 6, 7 and 12, the mounting hardware or mounting clips 10 cooperate with the support members 16 to mount the panels 14 to the support members 16 and indirectly to the ceiling. The hook arm 52 of each respective mounting clip 10 is configured to wrap around a respective flange 40, 42 of the support member 16. The respective flange 40, 42 is guided into the slot 56 by lead-in surface 54. Once the respective flange 40, 42 is positioned in the slot 56, the movable mounting section 58 is rotated or pivoted about the connection legs 60, thereby allowing the mounting flange 62 to be moved proximate the vertical flange 38. As this occurs, the locating tab 67 may be inserted into a respective locating slot 37 to help properly position the mounting clip 10 relative to the support member 16. With the mounting flange 62 positioned proximate the vertical flange 38, a screw may be inserted into either the screw receiving opening 64 or the screw receiving opening 65, thereby causing the mounting clips 10 to be securely fastened and positioned relative to the support members 16. The cooperation of the hooked arm 52 and the mounting flange 62 prevents the movement of the mounting clip 10 is a direction which is perpendicular to the longitudinal axis of the support member 16. The use of the screw prevents the movement of the mounting clip 10 is a direction which is essentially parallel to the longitudinal axis of the support member 16.

With the mounting clip 10 properly mounted and maintained in position on the support member 16, the panel 14 is moved into engagement with the mounting clip 10. In order to facilitate the movement of the panel 14 into the mounting clip 10, the first and second vertical sidewall sections 70, 72 are spread apart in the open position. In this position, the first and second vertical sidewall sections 70, 72 are spread apart a distance greater than the width of the panel 14, thereby allowing the panel 14 to be inserted until is positioned proximate to or engages the plate section 50.

With the panel 14 properly inserted between the first and second vertical sidewall sections 70, 72, the first and second vertical sidewall sections 70, 72 are rotated inward, toward each other, thereby moving the first and second vertical sidewall sections 70, 72 from the open position to the closed position. As this occurs the teeth 74 engage and pierce the panel 14. As the teeth 74 dig into the panel and are maintained in this position when the first and second vertical sidewall sections 70, 72 are in the closed position, the panel is maintained in position relative to the mounting clips 10 and the support member 16. The configuration of the first and second vertical sidewall sections 70, 72 allows the first and second vertical sidewall sections 70, 72 to be rotate using a hand tool such as a pliers or the like. This allows the first and second vertical sidewall sections 70, 72 to exhibit a sufficient force on the panel 14 when the first and second vertical sidewall sections 70, 72 are in the closed position to maintain the panel 14 in position. Additionally, if the optional hardware 78 is used, the hardware provides additional support to the panel 14 and prevents the first and second vertical sidewall sections 70, 72 from moving back toward the open position. This provides additional safety in areas which have increased seismic activity.

Depending upon the configuration and size of the panels 14, each mounting clip 10 is long enough to provide sufficient teeth 74 to support the weight of the panel 10 in the vertical position or a combination mounting clips 10 are sufficient to support the weight of the panel 10 in the vertical position.

In the exemplary embodiments, if the screw is loosened, the mounting clips 10 may slide freely along the support member 16. This allows the mounting clips, and ultimately the panels 14, to be positioned and repositioned in the appropriate location to achieve the desired acoustic properties or the desired aesthetics.

While the exemplary embodiment described that the mounting clips 10 are mounted on the support member 16 first and the panels 14 are then mounted to the mounting clips 10, this is just one exemplary method of assembly. As one exemplary alternative, the panels 14 may be mounted to the mounting clips 10 prior to the mounting clips being mounted to the support member 16.

Another alternate exemplary embodiment, not shown, has first and second vertical sidewall sections with no teeth. The mounting hardware extends through the openings provides the support for the panel. In this embodiment the first and second vertical sidewall sections are fixed and do not move between and open and a closed position.

Figure 15:
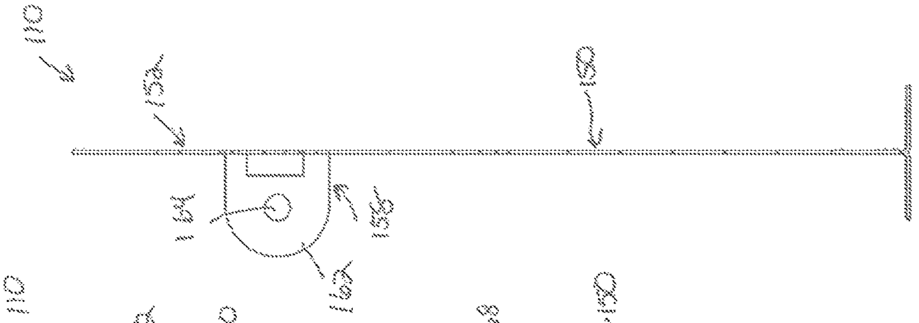
FIG. 15 is an end view of the exemplary mounting hardware shown in FIG. 13.
Figure 16:
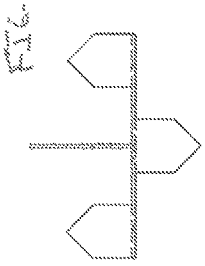
FIG. 16 is a bottom view of the exemplary mounting hardware shown in FIG. 13.
Figure 17:
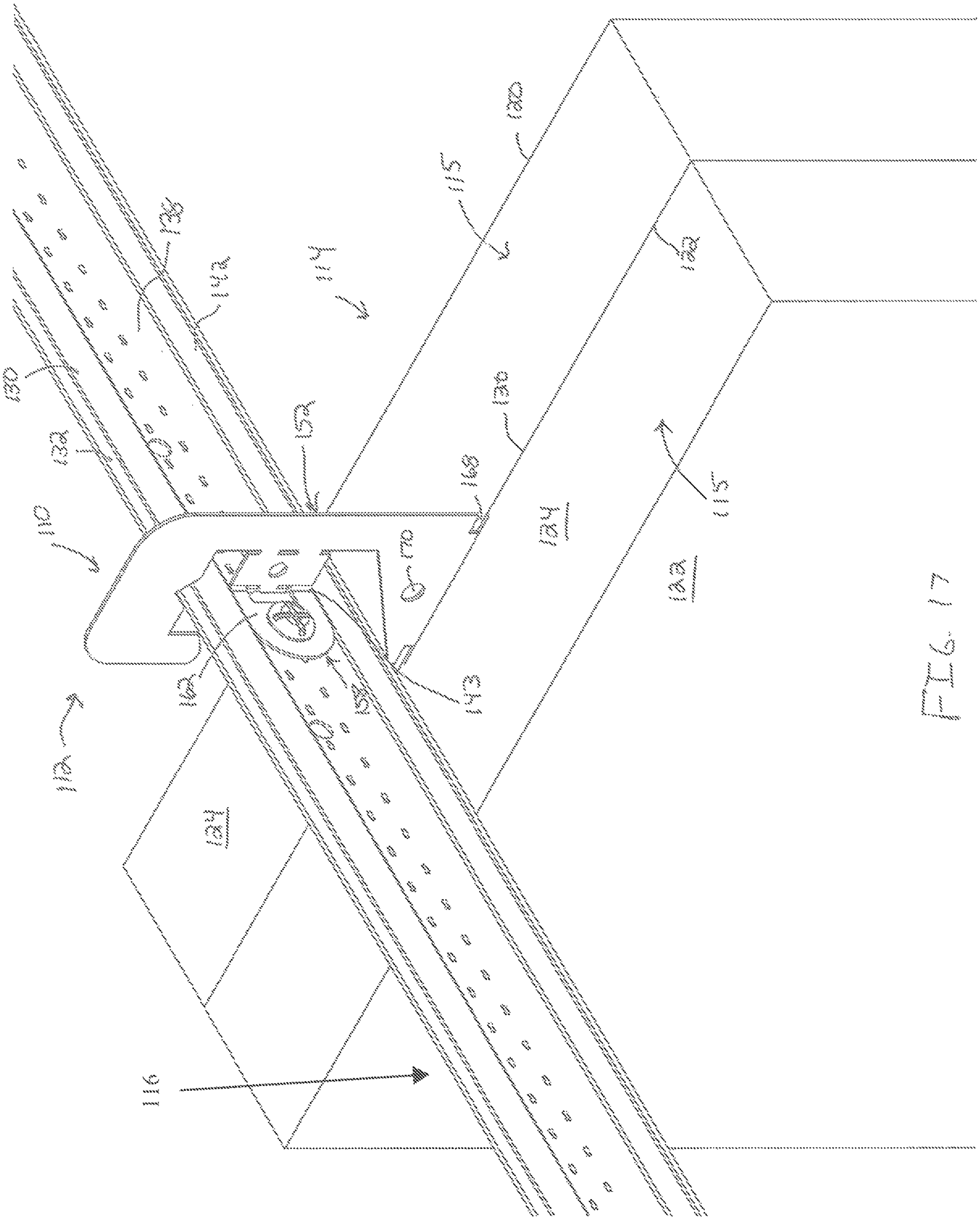
FIG. 17 is a perspective view of a panel mounted on the support member using the mounting hardware of FIG. 13.

Another alternate exemplary embodiment is illustrated in FIGS. 13 through 18. The mounting system 112 provides a platform for mounting at least one overhead, vertical panel 114 that is supported on the support member 116, as will be discussed in further detail below. The overhead panel 114 drops down in a generally vertical orientation from the plane of the ceiling 118 and can be combined with additional panels 114 (as shown in FIG. 17) or used individually. FIG. 16 illustrates a perspective view of the overhead mounting system 112 in accordance with this exemplary embodiment. The mounting system 112 includes one or more support members 116, the mounting hardware 110, and one or more panels 114.

The panels 114 are made by joining two panels 115. The panels 115 any known panels which perform the desired function. In general, each panel 115 is made from lightweight material having a first surface 120 and an oppositely facing second surface 122. A mounting surface or edge 124 extends between the first surface 120 and the second surface 122. In the exemplary embodiment shown, the panels 114 are rectangular, however, the panel can take any suitable shape, length, or width. While other embodiments may be used, in one example the panel 114 contains a cellular core having first and second side walls that are covered by a veneer or laminated outer skin. The veneer or outer skin may be any color according to the aesthetic desired. The cellular core may be made of a foam material, such as, but not limited to polystyrene that allows the vertical panel to be lightweight, for example, around 1-2 pounds per linear foot of elongate length. The outer skin may be formed of a suitable lightweight material, such as, but not limited to, material having the acoustic properties required, high impact polystyrene or expanded PVC. The type of material will depend upon the application for which the panel is to be used.

Figure 18:
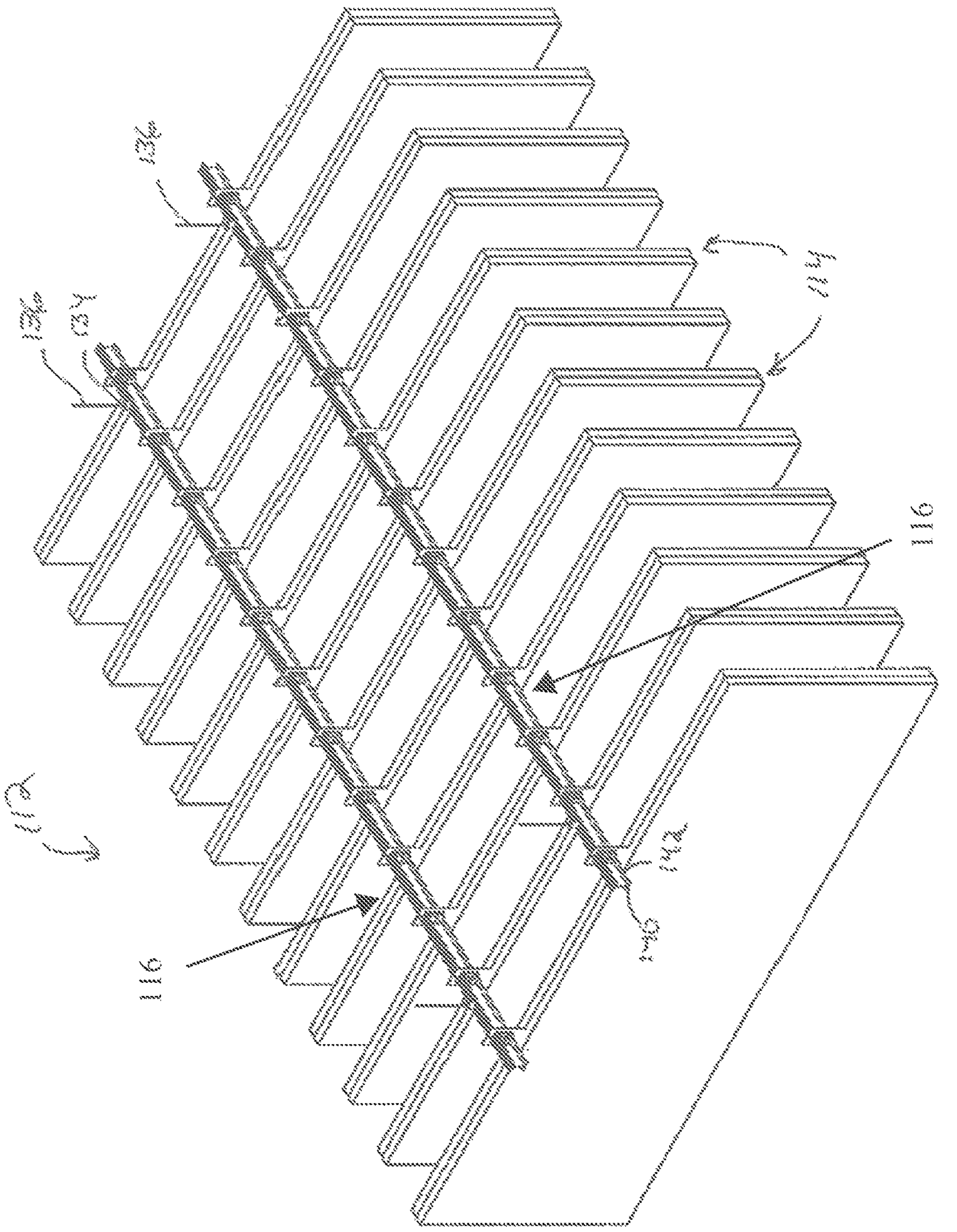
FIG. 18 is a perspective view of numerous panels mounted on the support member.

In the exemplary embodiment shown, the support members 116 have a modified I-shaped cross-section, which is most clearly shown in FIGS. 17 and 18. The support member 116 has a top mounting section 130 having a slot 132 for receiving and end 134 of a mounting wire 136 which is mounted to the ceiling 118 or the like. However, other configurations of the top mounting section 130 and other methods of mounting the support member 116 to the ceiling 118 can be used without departing from the scope of the invention. A vertical flange 138 extends between the mounting section 130 and horizontal cross members or flanges 140, 142. Locating slots 143 may also be provided periodically along the vertical flange 138.

According to the exemplary embodiment, the mounting hardware or mounting clip 110 includes a generally vertical plate section or panel mounting section 150 with a support member receiving portion or hook arm 152 which extends thereof. Extending from a portion of the hook arm 152 is a movable mounting section 158. The movable mounting section 158 has connection legs 160 which extend between the hook arm 152 and the mounting section 158, the legs 160 being configured to allow the mounting section 158 to rotate about the hook arm 152. The mounting section 158 has a mounting flange 162 with at least one screw receiving opening 164 which extends therethrough. More than one screw receiving opening 164 may be provided to allow the mounting section 158 to be bent to accommodate different support members 116 and still be secured thereto. A locating tab 167 may also be provided on the mounting section 158.

The configuration of the hook arm 152 is designed to allow the hook arm 152 to be inserted on standard grid, U-profiles, I-beam carrying members, peaked roof bulb design and other such configurations.

Figure 13:
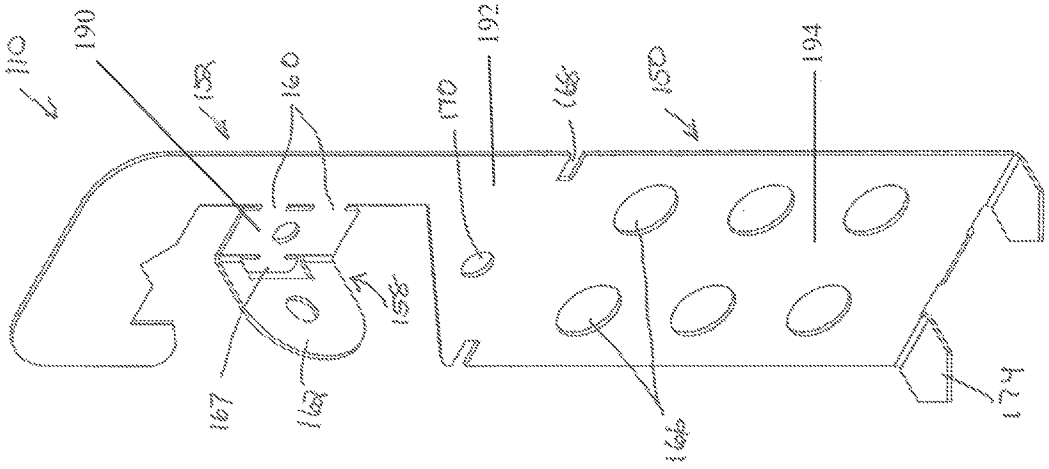
FIG. 13 is a perspective view of an alternate exemplary mounting hardware according the invention.
Figure 14:
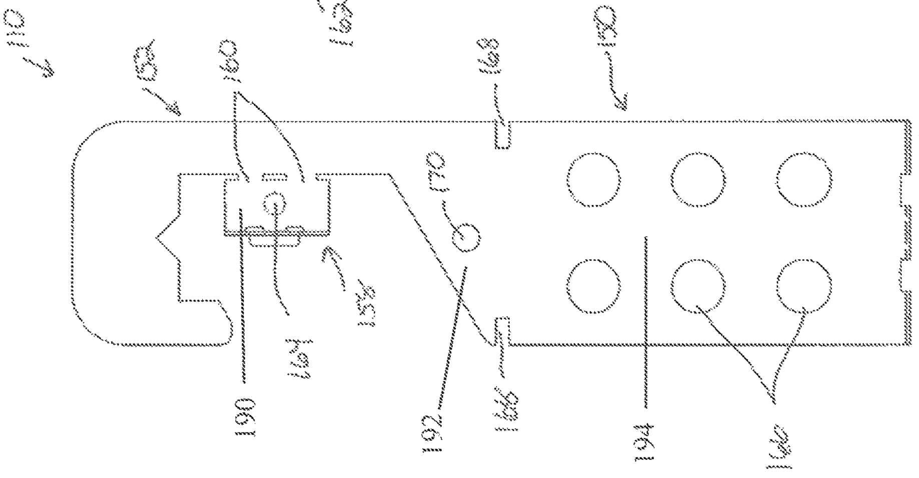
FIG. 14 is a side view of the exemplary mounting hardware shown in FIG. 13.

The plate section 150 has openings 166 which extend therethrough. The openings 166 allow adhesive to flow therethrough, as will be more fully described. Alignment notches 168 and a mounting opening 170 are also provided on the plate section 150. Projections or teeth 174 (as best shown in FIGS. 13 through 15), extend from both sides of the plate section 150. In the exemplary embodiment shown, the teeth 174 are formed along the edge of the plate section 150 which is furthest from the hook arm 152. The teeth 174 are in general vertical alignment with each other. However, other configurations of the teeth 174 are possible without departing from the scope of the invention.

In this embodiment, the mounting clips 110 are embedded in the panels 115 as the panels 115 are formed. Panels 114 have adhesive applied to facing surfaces. The panels 114 are moved together. As this occurs, the mounting clips 110 are positioned between the panels 114 such that the movement of the panels 114 together causes the mounting clips 110 to be captured between the panels 114. As this occurs, the teeth 174 engage and pierce the panels 114. Continued movement of the panels 114 toward each other causes the plate section 150 to be trapped between the panels 114. In this position, the adhesive applied to the panels 114 flows through the openings 166 to provide a strong bond between the panels 114 and the plate section 150. The alignment notches 168 are positioned proximate the top of the panels 114 to provide visual alignment as the panels and mounting clips 110 are joined together.

The mounting hardware or mounting clips 110 cooperate with the support members 116 to mount the panels 114 to the support members 16 and indirectly to the ceiling. As shown in FIG. 16, the hook arm 152 of each respective mounting clip 10 is configured to wrap around a respective the support member 116. Once the hook arm 152 is positioned on the support member 116, the movable mounting section 158 is rotated or pivoted about the connection legs 160, thereby allowing the mounting flange 162 to be moved proximate a vertical flange 138 of the support member 116. As this occurs, the locating tab 167 may be inserted into a respective locating slot 137 to help properly position the mounting clip 110 relative to the support member 116. With the mounting flange 162 positioned proximate the vertical flange 138, a screw may be inserted into either the appropriate screw receiving opening 164, thereby causing the mounting clips 110 to be securely fastened and positioned relative to the support members 116.

If the screw is loosened, the mounting clips 110 may slide freely along the support member 116. This allows the mounting clips, and ultimately the panels 114, to be positioned and repositioned in the appropriate location to achieve the desired acoustic properties or the desired aesthetics.

As will be appreciated from all of the embodiments, different number of panels can be mounted in differing configurations to accommodate the acoustic and/or aesthetic characteristics desired.

The mounting clips and mounting system allows for the panels to be removed and repaired/replaced if there is damage. There is no need to remove the mounting hardware or the mounting system in order to accomplish the repair/replacement.

The mounting clips and mounting system also allow for the repositioning of the panels. This allows for the panels to be repositioned as the needs or space changes.

The mounting clips and mounting system are also versatile. A wide range of materials and sizes of panels can be installed with the same hardware and same system, thereby reducing the need to change hardware.

The exemplary clips can be used to hang panels from standard grid, U-profiles, I-beam carrying members, peaked roof bulb design and other such configurations.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A ceiling system comprising:

a first support member configured to extend along a first longitudinal direction;

a first mounting unit comprising a plurality of mounting structures, the first mounting unit configured to extend along a second longitudinal direction, wherein each mounting structure of the plurality of mounting structures of the first mounting unit comprises a first mounting sidewall and a second mounting sidewall; and a plurality of acoustic ceiling baffles comprising vertical panels configured to extend along a third longitudinal direction, wherein the plurality of acoustic ceiling baffles comprises a first acoustic ceiling baffle and a second acoustic ceiling baffle;

wherein the plurality of acoustic ceiling baffles are configured to be coupled to the first mounting unit and the first mounting unit is configured to be coupled to the first support member, upon which the first longitudinal direction and the second longitudinal direction are parallel and the second longitudinal direction and the third longitudinal direction are orthogonal, and upon which the acoustic ceiling baffles are held in a suspended manner by the first mounting unit to the first support member; and wherein each vertical panel comprises a first major vertical surface, a second major vertical surface, and a top surface, wherein a first mounting sidewall of a first mounting structure of the first mounting unit is configured to be secured to the first major vertical surface of the vertical panel of the first acoustic ceiling baffle when the first mounting unit is coupled to the plurality of acoustic ceiling baffles, wherein a second mounting sidewall of the first mounting structure of the first mounting unit is configured to be secured to the second major vertical surface of the vertical panel of the second acoustic ceiling baffle when the first mounting unit is coupled to the plurality of acoustic ceiling baffles, and wherein upon the plurality of acoustic ceiling baffles being coupled to the first mounting unit, the first mounting unit is configured to directly overlap with a first top portion of the first major vertical surface, a second top portion of the second major vertical surface, and a portion of the top surface of each of the plurality of vertical panels while a first lower portion of the first major vertical surface and a second lower portion of the second major vertical surface extend below a lowermost end of the first mounting unit.

2. The ceiling system according to claim 1, wherein the first mounting unit comprises at least one unitary mounting component that is configured to be coupled directly to:

(1) the first support member; and (2) at least one of the plurality of vertical panels.

3. The ceiling system according to claim 1, wherein each of the plurality of vertical panels is configured to be coupled directly to the first mounting unit, and wherein when the plurality of vertical panels are coupled to the first mounting unit, an inner surface of each mounting structure of the first mounting unit is in direct surface contact with the first top portion of the first major vertical surface, the second top portion of the second major vertical surface, and the portion of the top surface of each of the plurality of vertical panels.

4. The ceiling system according to claim 1, wherein each of the plurality of vertical panels are configured to be coupled to the first mounting unit by a plurality of first fasteners and wherein the first mounting unit is configured to be coupled to the first support member by a plurality of second fasteners, the first fasteners and the second fasteners being different, and wherein the first fasteners are distinct from the first mounting unit.

5. The ceiling system according to claim 1, wherein the first mounting unit comprises a plurality of separate and distinct mounting clips.

6. The ceiling system according to claim 1 further comprising:

a second support member configured to extend along a fourth longitudinal direction;

a second mounting unit comprising a plurality of mounting structures, the second mounting unit configured to extend along a fifth longitudinal direction;

wherein the plurality of vertical panels are configured to be coupled to the second mounting unit and the second mounting unit is configured to be coupled to the second support member, upon which the fourth longitudinal direction and the fifth longitudinal direction are parallel and the fifth longitudinal direction and the third longitudinal direction are orthogonal.

7. The ceiling system according to claim 1, wherein each of the plurality of vertical panels is configured to be supported from above by the first mounting unit with a lower portion of the plurality of vertical panels that comprises the first lower portion of the first major vertical surface and the second lower portion of the second major vertical surface hanging freely from the first mounting unit.

8. The ceiling system according to claim 1, wherein each mounting structure of the plurality of mounting structures of the first mounting unit is configured to engage with at least two surfaces of an acoustic ceiling baffle.

9. A ceiling system comprising:

a plurality of support members;

a plurality of mounting assemblies, wherein each mounting assembly comprises a first mounting sidewall and a second mounting sidewall;

a plurality of vertical baffle panels, each of the plurality of vertical baffle panels comprising a first major vertical surface, a second major vertical surface, and a top surface;

wherein the plurality of vertical baffle panels are configured to be coupled to the plurality of mounting assemblies and the plurality of mounting assemblies are configured to be coupled to the plurality of support members;

wherein the first and second major vertical surfaces of the plurality of vertical baffle panels are configured to be supported within the ceiling system by direct coupling to the first and second mounting sidewalls of the plurality of mounting assemblies and wherein the plurality of mounting assemblies are configured to be directly coupled to the plurality of support members;

wherein upon the plurality of vertical baffle panels being coupled to the plurality of mounting assemblies, an inner surface of each of the plurality of mounting assemblies at least partially overlaps and interfaces with a first top portion of the first major vertical surface, a second top portion of the second major surface, and a portion of the top surface of at least one of the plurality of vertical baffle panels while a lower portion of the at least one of the plurality of vertical baffle panels protrudes beyond a bottom end of the mounting assemblies; and wherein the plurality of support members are configured to extend parallel to each other along a first direction, the plurality of mounting assemblies are configured to extend parallel to each other along a second direction, and the plurality of vertical baffle panels are configured to extend parallel to each other along a third direction, wherein the first direction and the second direction are parallel and the first direction and the third direction are orthogonal.

10. The ceiling system according to claim 9, further comprising mounting hardware that couples the plurality of mounting assemblies to the plurality of vertical baffle panels, wherein the mounting hardware is a distinct component relative to the mounting assemblies and the vertical baffle panels.

11. The ceiling system according to claim 9, wherein the plurality of vertical baffle panels are configured to be coupled to the plurality of mounting assemblies by a plurality of first fasteners and the plurality of mounting assemblies are configured to be coupled to the plurality of support members by a plurality of second fasteners, and wherein the plurality of first fasteners are distinct from and non-integral with the plurality of mounting assemblies.

12. The ceiling system according to claim 9, wherein the plurality of mounting assemblies each comprise a plurality of separate and distinct mounting clips.

13. The ceiling system according to claim 9, wherein each of the plurality of vertical baffle panels is configured to be supported only from above by one or more of the plurality of mounting assemblies with the lower portion of the plurality of vertical baffle panels hanging freely from the plurality of mounting units.

14. The ceiling system according to claim 9, wherein each of the plurality of vertical baffle panels comprises a panel length, and wherein two adjacent ones of the plurality of support members are configured to be horizontally offset by an offset distance that is less than the panel length.

15. A ceiling system comprising:

a first support member configured to extend along a first longitudinal direction;

a first mounting unit configured to extend along a second longitudinal direction, wherein the first mounting unit comprises a first fastener plate;

a plurality of vertical panels configured to extend along a third longitudinal direction, each of the plurality of vertical panels having a major vertical outer surface and a top edge;

a second support member configured to extend along a fourth longitudinal direction;

a second mounting unit configured to extend along a fifth longitudinal direction, wherein the second mounting unit comprises a second fastener plate;

wherein the major vertical outer surfaces of the plurality of vertical panels are configured to be coupled to the first fastener plate of the first mounting unit and the second fastener plate of the second mounting unit so that the first and second mounting units interface with the top edge and upper portions of the outer surface of the plurality of vertical panels, and wherein lower portions of the plurality of vertical panels protrude beyond and hang freely from bottom ends of the first and second mounting units; and wherein the first mounting unit is configured to be coupled to the first support member and the second mounting unit is configured to be coupled to the second support member, upon which the first longitudinal direction and the second longitudinal direction are parallel, the second longitudinal direction and the third longitudinal direction are orthogonal, the fourth longitudinal direction and the fifth longitudinal direction are parallel, and the fifth longitudinal direction and the third longitudinal direction are orthogonal.

16. The ceiling system according to claim 15, wherein each of the plurality of vertical panels comprise a first major vertical surface opposite a second major vertical surface and a plurality of side surfaces extending between the first major vertical surface and the second major vertical surface, and wherein the first mounting unit at least partially overlaps with a first top portion of the first major vertical surface and a second top portion of the second major vertical surface of each of the plurality of vertical panels.

17. The ceiling system according to claim 15, wherein each of the plurality of vertical panels is coupled solely to the first and second mounting units.

18. The ceiling system according to claim 15, wherein each of the plurality of vertical panels are coupled to the first mounting unit by a plurality of first fasteners and the first mounting unit is coupled to the first support member by a plurality of second fasteners, the first fasteners and the second fasteners being different.

19. The ceiling system according to claim 15, wherein the first mounting unit comprises a plurality of separate and distinct mounting clips.

20. The ceiling system according to claim 15, wherein each of the plurality of vertical panels comprises a panel length as measured along the third longitudinal direction, and wherein the first support member and the second support member are configured to be offset from each other by an offset distance that is less than the panel length.

* * * * *